US012413620B1

(12) United States Patent
Dambra

(10) Patent No.: US 12,413,620 B1
(45) Date of Patent: Sep. 9, 2025

(54) SYSTEMS AND METHODS FOR IDENTIFYING BRANDS UTILIZED IN WEBSITE PHISHING CAMPAIGNS

(71) Applicant: GEN DIGITAL INC., Tempe, AZ (US)

(72) Inventor: Savino Dambra, Nice (FR)

(73) Assignee: Gen Digital Inc., Tempe, AZ (US)

( * ) Notice: Subject to any disclaimer, the term of this patent is extended or adjusted under 35 U.S.C. 154(b) by 128 days.

(21) Appl. No.: 18/509,754

(22) Filed: Nov. 15, 2023

(51) Int. Cl.
*H04L 9/40* (2022.01)

(52) U.S. Cl.
CPC ...... *H04L 63/1483* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 9,253,208 B1* | 2/2016 | Koshelev | H04L 63/20 |
| 10,404,723 B1* | 9/2019 | Mushtaq | H04L 63/1425 |
| 10,834,128 B1* | 11/2020 | Rajagopalan | H04L 51/212 |
| 11,184,393 B1* | 11/2021 | Gendre | G06F 16/2379 |
| 11,575,708 B2* | 2/2023 | Devane | H04L 63/1416 |
| 2017/0195363 A1* | 7/2017 | Dahan | H04L 63/1483 |
| 2019/0014149 A1* | 1/2019 | Cleveland | G06N 3/045 |
| 2019/0068638 A1* | 2/2019 | Bartik | H04L 63/1483 |
| 2020/0151222 A1* | 5/2020 | Mannar | G06F 16/951 |
| 2020/0204587 A1* | 6/2020 | Hunt | G06F 21/128 |
| 2021/0099485 A1* | 4/2021 | Lancioni | H04L 67/02 |
| 2021/0406366 A1* | 12/2021 | Betser | H04L 63/0245 |
| 2022/0030029 A1* | 1/2022 | Kagan | G06F 21/44 |
| 2022/0070216 A1* | 3/2022 | Kohavi | H04L 63/1416 |
| 2022/0385694 A1* | 12/2022 | Zverkov | G06V 10/751 |
| 2023/0007042 A1* | 1/2023 | Haworth | H04L 63/205 |

(Continued)

OTHER PUBLICATIONS

Das, Maitri, "Logos: A Brand Independent logo detection model", Analytics Vidhya, retrieved Mar. 4, 2024; 14 pages.

(Continued)

*Primary Examiner* — Khang Do
(74) *Attorney, Agent, or Firm* — Greenberg Traurig, LLP

(57) ABSTRACT

A computer-implemented method for identifying brands utilized in website phishing campaigns may include (i) capturing a website screenshot including visual elements representing a potential phishing vulnerability, (ii) transforming, utilizing a deep learning model, the website screenshot into an image representation including embeddings, (iii) determining whether the transformed website screenshot matches a dataset including reference transformed website screenshots representing previously identified brands utilized in phishing campaigns, (iv) clustering, upon determining a mismatch between the transformed website screenshot and the dataset, the transformed website screenshot with other transformed website screenshots sharing the visual elements representing the potential phishing vulnerability and one or more visual similarities, and (v) performing, based on the clustering, a security action that protects against potential phishing attacks by extracting brand information for adding to the dataset. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2023/0087924 A1* | 3/2023 | Sinks | ............... | H04L 63/0236 |
| | | | | 726/23 |
| 2023/0262078 A1* | 8/2023 | Rozhnov | ............ | H04L 63/1425 |
| | | | | 726/1 |
| 2023/0275922 A1* | 8/2023 | Choi | ................. | H04L 63/0236 |
| 2023/0344868 A1* | 10/2023 | Kaligotla | ............ | H04L 63/1416 |
| 2023/0421602 A1* | 12/2023 | Boyer | ................. | G06V 30/10 |
| 2024/0356967 A1* | 10/2024 | Costa | ................. | G06V 10/82 |
| 2025/0106249 A1* | 3/2025 | Graziano | ............... | H04L 51/18 |

OTHER PUBLICATIONS

Liu, et al., "Inferring Phishing Intention via Webpage Appearance and Dynamics: A Deep Vision Based Approach", 31st USENIX Security Symposium; 18 pages.

\* cited by examiner

SYSTEMS AND METHODS FOR IDENTIFYING BRANDS UTILIZED IN WEBSITE PHISHING CAMPAIGNS

BACKGROUND

Computing device users are increasingly being targeted by website phishing campaigns utilizing fake websites associated with known brands (e.g., financial institutions) for luring victims into providing sensitive data (e.g., account login information) to be utilized for malicious purposes. Traditional approaches for detecting phishing campaigns may often utilize multi-feed processing (e.g., malware scans, user telemetry, community-based phishing verification, etc.) to identify potentially malicious URLs. These URLs may then be crawled by a custom browser and their associated screenshots are compared against a dataset of phishing websites that target known brands. These traditional approaches however, are only effective if a targeted brand is present in the dataset. As a result, potential phishing URLs associated with brands that are not present in the dataset will go undetected.

SUMMARY

As will be described in greater detail below, the present disclosure describes various systems and methods for identifying brands utilized in website phishing campaigns.

In one example, a method for identifying brands utilized in website phishing campaigns may include (i) capturing a website screenshot including visual elements representing a potential phishing vulnerability, (ii) transforming, utilizing a deep learning model, the website screenshot into an image representation including embeddings, (iii) determining whether the transformed website screenshot matches a dataset including a set of reference transformed website screenshots representing previously identified brands utilized in phishing campaigns, (iv) clustering, upon determining a mismatch between the transformed website screenshot and the dataset, the transformed screenshot with other transformed website screenshots sharing the visual elements representing the potential phishing vulnerability and visual similarities, and (v) performing, based on the clustering, a security action that protects against potential phishing attacks by extracting brand information for adding to the dataset.

In some examples, the website screenshot may be captured by identifying a discarded URL associated with a website including the website screenshot. Additionally, the website screenshot may be captured by parsing hypertext markup language (HTML) code for a website associated with the website screenshot to detect the visual elements representing the potential phishing vulnerability. Additionally or alternatively, the website screenshot may be captured by utilizing a pre-trained machine learning model to detect the visual elements representing the phishing vulnerability in a website associated with the website screenshot. In one example, the visual elements representing the phishing vulnerability may include a website form for receiving authentication credentials. The website form, in some examples, may alternatively include user sensitive information (e.g., personally identifiable information (PII)) such as credit card numbers, social security, numbers, etc.).

In some examples, the website screenshot may be transformed by reducing a set of pixel matrices representing the website screenshot into a corresponding vector representation in a neural network. In some examples, the clustering may include (i) determining a clustering frequency, (ii) clustering the transformed website screenshot with the other website screenshots based on the determined frequency, (iii) identifying user telemetry data corresponding to the transformed website screenshot and the other transformed website screenshots for each of a set of target clusters, and (iv) ranking the target clusters based on a relevance of the user telemetry data with the transformed website screenshot and the other transformed website screenshots.

In some examples, the security action may include (i) identifying a logo in the transformed website screenshot to identify image data associated with the brand information, (ii) performing OCR on a header of a website for the transformed website screenshot to identify text data associated with the brand information, and/or (iii) retrieving text from a footer of the website for the transformed website screenshot to identify additional text data associated with the brand information.

In one embodiment, a system for identifying brands utilized in website phishing campaigns may include at least one physical processor and physical memory that includes computer-executable instructions and a set of modules that, when executed by the physical processor, cause the physical processor to (i) capture, by a capture module, a website screenshot including visual elements representing a potential phishing vulnerability, (ii) transform, by a transformation module and utilizing a deep learning model, the website screenshot into an image representation including embeddings, (iii) determine, by a determining module, whether the transformed website screenshot matches a dataset including a set of reference transformed website screenshots representing previously identified brands utilized in phishing campaigns, (iv) cluster, by a cluster module and upon determining a mismatch between the transformed website screenshot and the dataset, the transformed screenshot with other transformed website screenshots sharing the visual elements representing the potential phishing vulnerability and visual similarities, and (v) perform, by a security module and based on the clustering, a security action that protects against potential phishing attacks by extracting brand information for adding to the dataset.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) capture a website screenshot including visual elements representing a potential phishing vulnerability, (ii) transform, utilizing a deep learning model, the website screenshot into an image representation including embeddings, (iii) determine whether the transformed website screenshot matches a dataset including a set of reference transformed website screenshots representing previously identified brands utilized in phishing campaigns, (iv) cluster, upon determining a mismatch between the transformed website screenshot and the dataset, the transformed screenshot with other transformed website screenshots sharing the visual elements representing the potential phishing vulnerability and visual similarities, and (v) perform, based on the clustering, a security action that protects against potential phishing attacks by extracting brand information for adding to the dataset.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
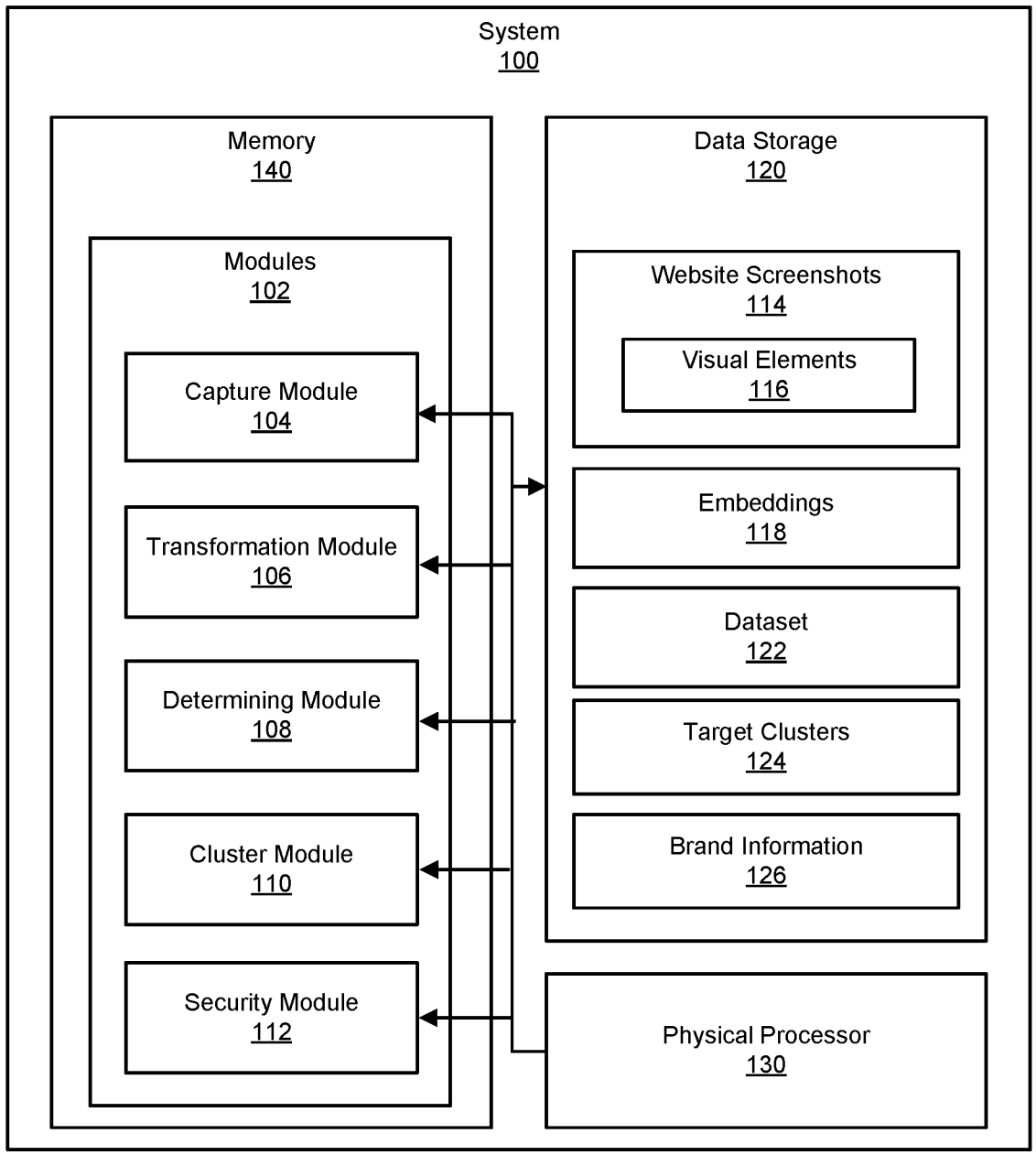
FIG. 1 is a block diagram of an example system for identifying brands utilized in website phishing campaigns.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for identifying brands utilized in website phishing campaigns. As will be described in greater detail below, the systems and methods described herein may utilize discarded URLs to discover new or previously unidentified brands for adding to a dataset of targeted brands that may potentially be utilized in website phishing campaigns. Additionally, the systems and methods described herein may be utilized to capture a website screenshot (i.e., screenshots that may include any sensitive information or PII that may be utilized by attackers either directly (e.g., forms for receiving user login credentials or credit card information) or indirectly (e.g., social security numbers, e-mail, or physical addresses for performing identity theft) and compute its embeddings (i.e., transform an image into a vector utilizing a deep learning model) and further look for matches in a dataset of screenshots (transformed in embeddings as well) of known brands. Additionally, the systems and methods described herein may further cluster the screenshots based on an adjustable frequency to identify groups of similar websites. Additionally, the systems and methods described herein may further sort the clusters by relevance based on user telemetry (such that the more URLs corresponding to the screenshots in the clusters match the telemetry the higher the priority, with the goal of maximizing the number of protected users). Additionally, the systems and methods described herein may then run brand recognition techniques on each cluster including, without limitation, generic logo detection, running OCR on a website header, and extracting text and brands from a website footer.

Figure 2:
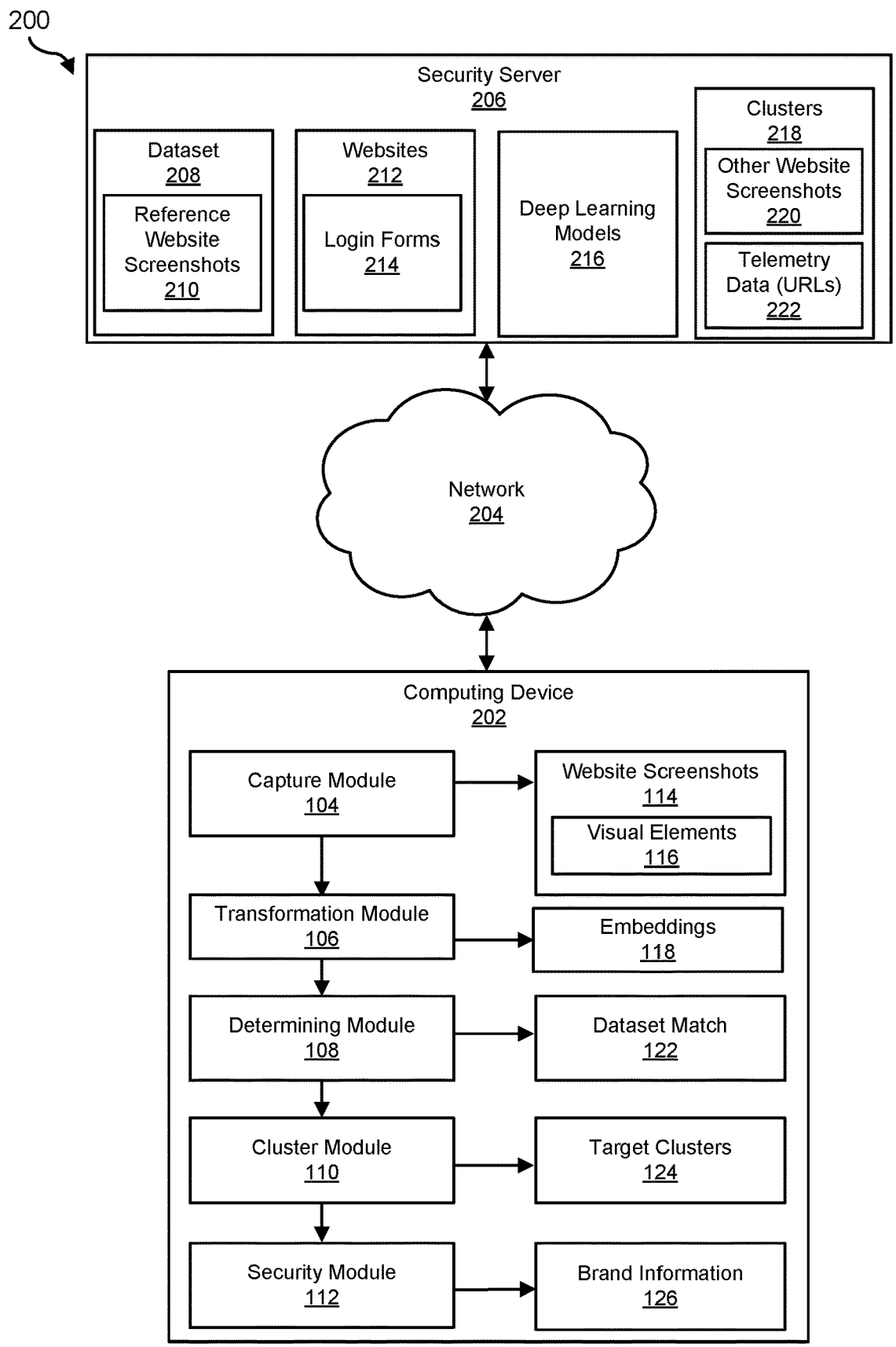
FIG. 2 is a block diagram of an additional example system for identifying brands utilized in website phishing campaigns.

In addition, the systems and methods described herein may improve the technical fields of computing device security and data privacy by protecting users against website phishing campaigns utilizing websites mimicking familiar brands to capture private user data, such as user authentication credentials, credit card numbers, and/or other sensitive data The following will provide, with reference to FIGS. 1-2, detailed descriptions of example systems for identifying brands utilized in website phishing campaigns. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for identifying brands utilized in website phishing campaigns. As illustrated in this figure, example system 100 may include one or more modules 102 for performing one or more tasks. As will be explained in greater detail below, modules 102 may include a capture module 104 that captures website screenshots 114 including visual elements 116 representing a potential phishing vulnerability. Example system 100 may additionally include a transformation module 106 that transforms, utilizing a deep learning model, a website screenshot 114 into an image representation including embeddings 118. Example system 100 may also include a determination module 108 that determines whether a transformed website screenshot 114 is a dataset match 122 with reference transformed website screenshots representing previously identified brands utilized in phishing campaigns. Example system 100 may additionally include a cluster module 110 that clusters a transformed website screenshot 114 with other transformed website screenshots sharing visual elements 116 representing the potential phishing vulnerability and visual similarities. Example system 100 may also include a security module 110 that performs a security action that protects against potential phishing attacks by extracting brand information 126 for adding to the dataset (i.e., the dataset of reference transformed website screenshots representing the previously identified brands utilized in phishing campaigns). Although illustrated as separate elements, one or more of modules 102 in FIG. 1 may represent portions of a single module or application.

The term "potential phishing vulnerability" as used herein, generally refers to any website containing an exploitable pathway that may be utilized by malicious actors for stealing sensitive data for carrying out a phishing attack or campaign. For example, a financial services website containing a login form that receives customer authentication credentials for accessing account information and/or carrying out financial transactions, may be exploited by a visually similar phishing website designed to steal the customer credentials.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or security server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate identifying brands utilized in website phishing campaigns. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store website screenshots 114 (including visual elements 116), embeddings, 118, dataset match 122, target clusters 124, and brand information 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with security server 206 via a network 204. In one example, all or a portion of the functionality of modules 102 may be performed by computing device 202, security server 206, and/or any other suitable computing system. As will be described in greater detail below, one or more of modules 102 from FIG. 1 may, when executed by at least one processor of computing device 202 and/or security server 206, enable computing device 202 and/or security server 206 to identify brands utilized in website phishing campaigns. For example, and as will be described in greater detail below, capture module 104, transformation module 106, determining module 108, cluster module 110, and security module 112 may cause computing device 202 and/or security server 206 to (i) capture a website screenshot 114 including visual elements 116 representing a potential phishing vulnerability, (ii) transform, utilizing a deep learning model 216, a website screenshot 114 into an image representation including embeddings 118, (iii) determine whether a transformed website screenshot 114 is a dataset match 122 in a dataset 208 including reference transformed website screenshots 210 representing previously identified brands utilized in phishing campaigns, (iv) cluster (in clusters 218), upon determining a mismatch between a transformed website screenshot 114 and dataset 208 and telemetry data 222, a transformed website screenshot 114 with other transformed website screenshots 220 sharing visual elements 116 representing the potential phishing vulnerability and one or more visual similarities, and (v) perform, based on the clustering, a security action that protects against potential phishing attacks by extracting brand information 126 for adding to dataset 208.

Computing device 202 generally represents any type or form of computing device capable of reading computer-executable instructions. In some examples, computing device 202 may represent an endpoint device running client-side security software including a browser application or browser extension for viewing and accessing websites. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Security server 206 generally represents any type or form of computing device that is capable of reading and/or executing computer-executable instructions. In some examples, security server 206 may represent a backend server computing device, running a web crawler that provides threat protection services for web browsers. Additional examples of security server 206 include, without limitation, application servers, web servers, storage servers, and/or database servers configured to run certain software applications and/or provide various security, web, storage, and/or database services. Although illustrated as a single entity in FIG. 2, security server 206 may include and/or represent a plurality of servers that work and/or operate in conjunction with one another.

Network 204 generally represents any medium or architecture capable of facilitating communication or data transfer. In one example, network 204 may facilitate communication between computing device 202 and security server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
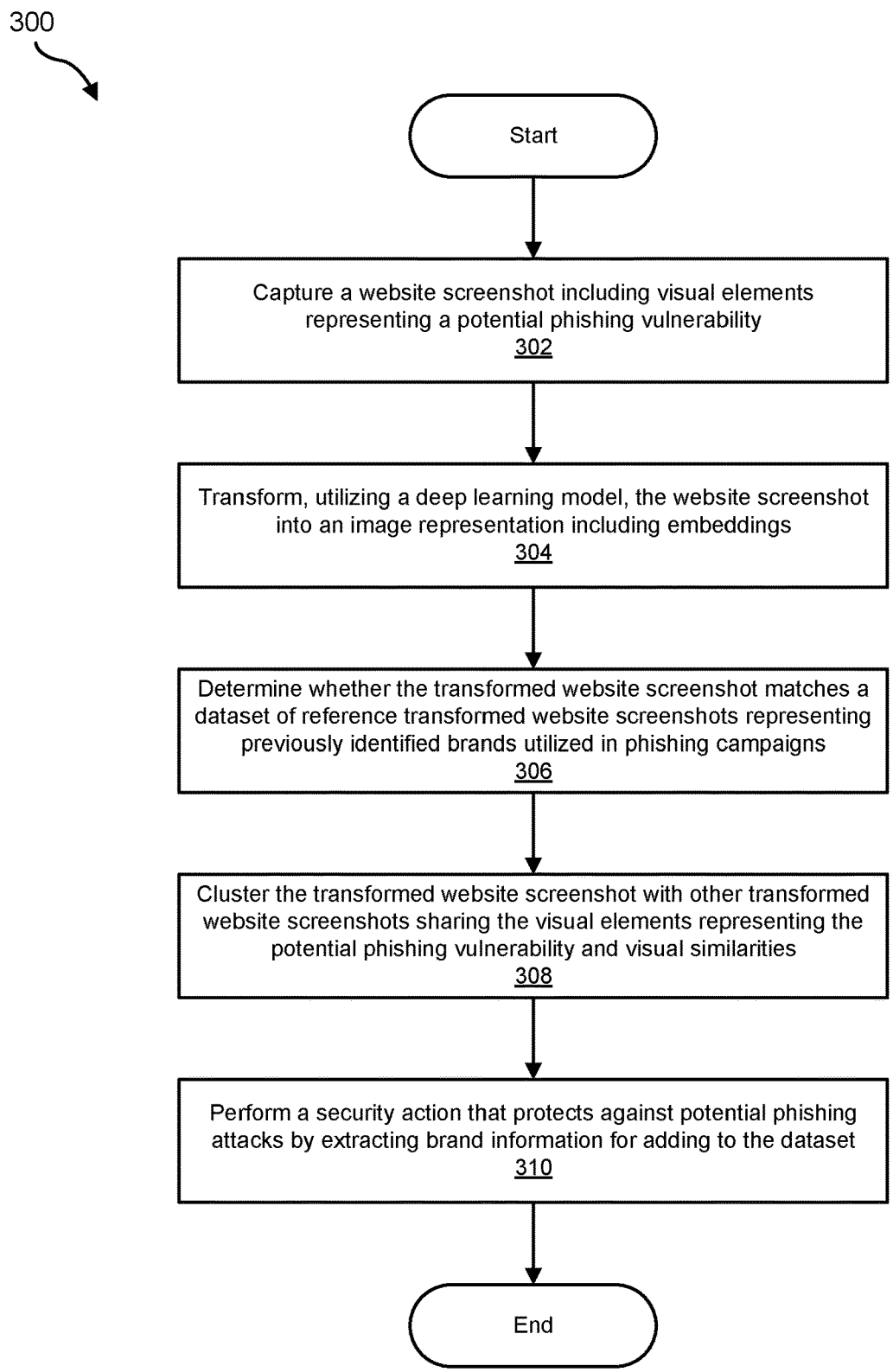
FIG. 3 is a flow diagram of an example method for identifying brands utilized in website phishing campaigns.
Figure 4:
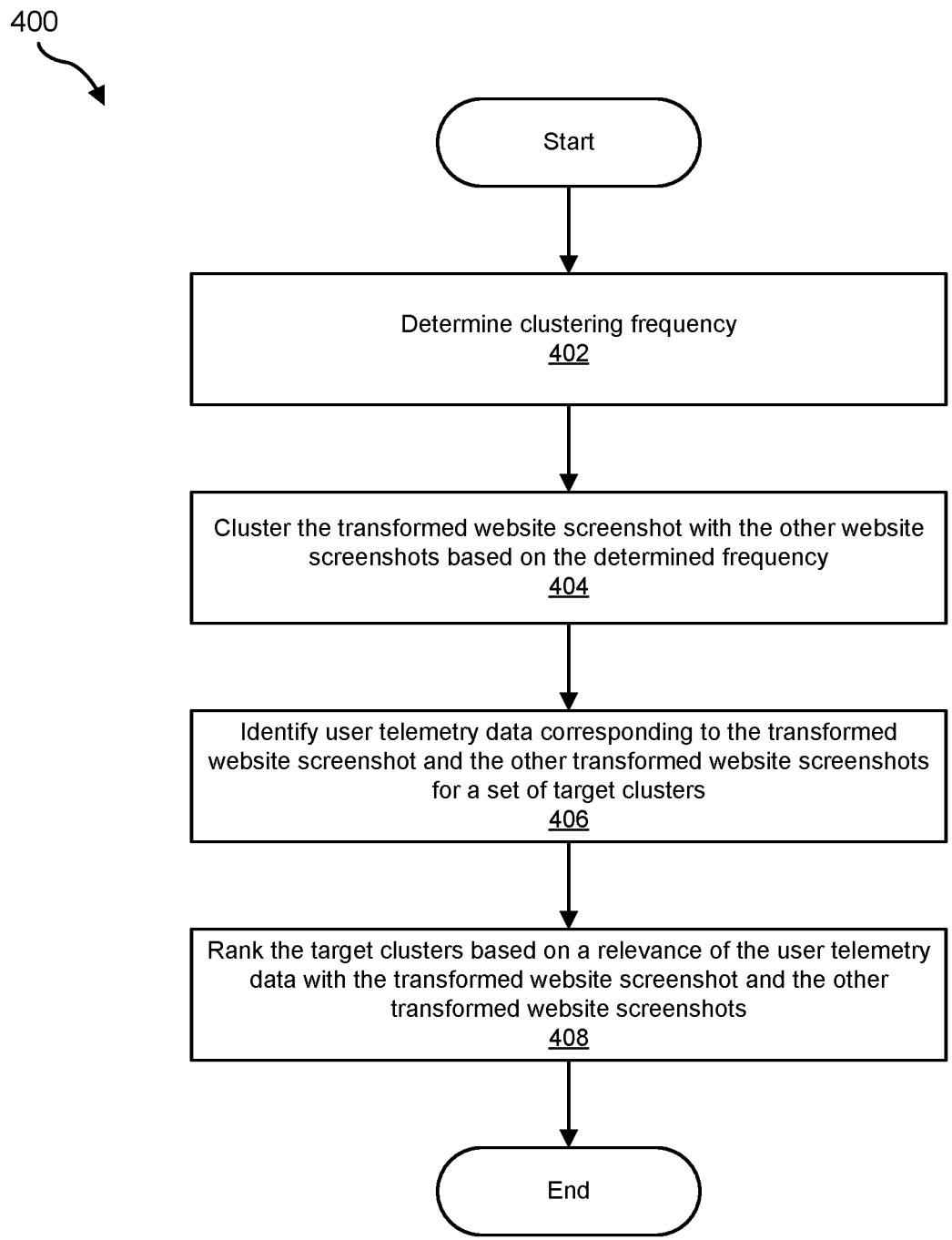
FIG. 4 is a flow diagram of an additional example method for identifying brands utilized in website phishing campaigns.
Figure 5:
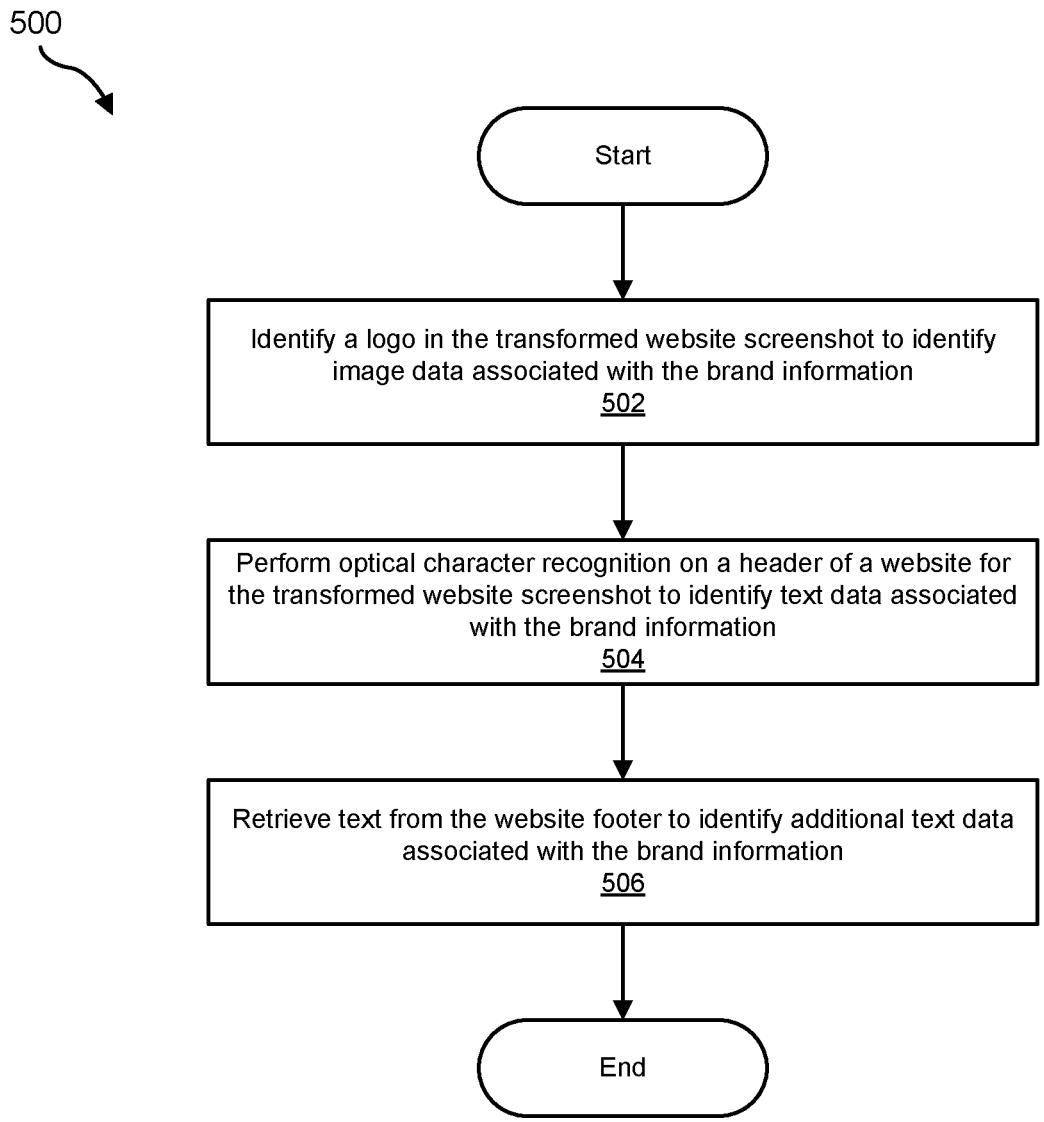
FIG. 5 is a flow diagram of an additional example method for identifying brands utilized in website phishing campaigns.

FIGS. 3-5 are flow diagrams of example computer-implemented methods 300, 400, and 500, for identifying brands utilized in website phishing campaigns. The steps shown in FIGS. 3-5 may be performed by any suitable computer-executable code and/or computing system, including system 100 in FIG. 1, system 200 in FIG. 2, and/or variations or combinations of one or more of the same. In one example, each of the steps shown in FIGS. 3-5 may represent an algorithm whose structure includes and/or is represented by multiple sub-steps, examples of which will be provided in greater detail below.

As illustrated in FIG. 3, at step 302 one or more of the systems described herein may capture a website screenshot including visual elements representing a potential phishing vulnerability. For example, capture module 104 may, as part of computing device 202 in FIG. 2, capture a website screenshot 114 including visual elements 116 (e.g., a login form for receiving authentication credentials).

Capture module 104 receive may capture a website screenshot 114 in a variety of ways. In one example, capture module 104 may capture a website screenshot 114 that is identified by a discarded URL for a website 212. In this example, a discarded URL may be a captured URL associated with a website screenshot that may be similar (i.e., above a threshold) to a known phishing website for a previously identified brand but which has a domain that does not match the brand's domain. In some examples, capture module 104 may capture a website screenshot 114 by parsing HTML code for an associated website 212 to detect visual elements 116 (e.g., a login form) representing a potential phishing vulnerability. Additionally or alternatively, capture module 104 may capture a website screenshot 114 by utilizing a pre-trained machine learning model (e.g., a deep learning model 216) to detect visual elements 116.

At step 304, one or more of the systems described herein may transform, utilizing a deep learning model, the website screenshot into an image representation including embeddings. For example, transformation module 106 may, as part of computing device 202 in FIG. 2, utilize a deep learning model 216 to transform a website screenshot 114 into an image representation including embeddings 118.

Transformation module 106 may transform a website screenshot 114 in a variety of ways. In some examples, transformation module 106 may reduce a set of pixel matrices representing a website screenshot 114 into a corresponding vector representation (e.g., a 512 element vector) in a neural network. For example, a neural network architecture that may be utilized in some examples, may include an encoder component and a search engine component. In one example, the encoder component may be configured as a module that retrieves an image (i.e., a website screenshot) and returns a vector as an output. The image in the encoder input may be represented as a set of matrices (e.g., red, blue, and green levels) of float values ($0<=v<=1$). Each element in a matrix represents a level of the corresponding color in a corresponding pixel. The process of transforming an image into its corresponding vector representation may be achieved through a neural network that performs a series of operations with the purpose of performing dimensionality reduction (e.g., going from three matrices of 224×224 pixels to a vector of 512 elements) depending on the architecture (i.e., other dimensionality reductions may also be performed). The aforementioned process is identified as encoding because its goal is to obtain a vector of floats that represents an image. In some examples, the neural network may be selected based on various use cases. In one example, the neural network architecture may utilize a Visual Geometry Group convolutional layer neural network (e.g., VGG-16) or more complex architectures to perform encoding.

At step 306, one or more of the systems described herein may determine whether the transformed website screenshot matches a dataset of reference transformed website screenshots representing previously identified brands utilized in phishing campaigns. For example, determining module 108 may, as part of computing device 202 in FIG. 2, determine whether a transformed website screenshot 114 matches reference website screenshots 210 in dataset 208.

Determining module 108 may determine whether a transformed website screenshot 114 matches reference website screenshots 210 in dataset 208 in a variety of ways. In one example, determining module 108 may utilize a search engine component in a neural network architecture (e.g., the neural network architecture described above in step 304). The search engine component may be configured to receive a vector as an input, perform a database search (with other vectors), and return, as an output, the closest vector (i.e., the closest image) corresponding to the input with a certain similarity score ($0<=$similarity$<=1$). In some examples, when testing a new website screenshot to determine whether it matches any existing brands/brand campaigns in a dataset, the website screenshot may be run through an encoder (described above in step 304) and then the nearest vector may be found by measuring the cosine similarity with all of a group of samples in the dataset. If a sample representing the new website screenshot is similar (i.e., based on the cosine similarity being above a certain threshold) to the group of samples in the dataset, then there is a match. Alternatively, if the cosine similarity is below the threshold, then there is not a match (i.e., a mismatch) between the new website screenshot and the group of samples in the dataset.

At step 308, one or more of the systems described herein may cluster the transformed website screenshot with other transformed website screenshots sharing the visual elements representing the potential phishing vulnerability and visual similarities. For example, cluster module 110 may, as part of computing device 202 in FIG. 2, cluster a transformed website screenshot 114 with other website screenshots 220. Cluster module 110 cluster a transformed website screenshot 114 with other website screenshots 220 in a variety of ways as will now be described with respect to FIG. 4.

Turning now to FIG. 4, at step 402, one or more of the systems described herein may determine a clustering frequency. For example, cluster module 110 may, as part of computing device 202 in FIG. 2, determine an adjustable frequency (e.g., daily, every two, three, four, five, or six days, weekly, etc.) to cluster website screenshots 114 for identifying groups of webpages (e.g., websites 212) presenting login forms 214 and have additional visual similarities. In one example, cluster module 110 may utilize one or more clustering algorithms that do not require specifying a number of clusters (e.g., DBSCAN).

At step 404, one or more of the systems described herein may cluster the transformed website screenshot with the other website screenshots based on the determined frequency. For example, cluster module 110 may, as part of computing device 202 in FIG. 2, cluster a transformed website screenshot 114 with other website screenshots 220 based on the determined frequency (e.g., daily or weekly) in clusters 218.

At step 406, one or more of the systems described herein may identify user telemetry data corresponding to the transformed website screenshot and the other transformed website screenshots for a set of target clusters. For example, cluster module 110 may, as part of computing device 202 in FIG. 2, identify telemetry data (i.e., URLs) corresponding to a transformed website screenshot 114 and corresponding to other website screenshots 220 for a target cluster 124.

At step 408, one or more of the systems described herein may rank the target clusters based on a relevance of the user telemetry data with the transformed website screenshot and the other transformed website screenshots. For example, cluster module 110 may, as part of computing device 202 in FIG. 2, rank a target cluster 124 based on a relevance of URLs with a transformed website screenshot 114 and other website screenshots 220. In some examples, the more URLs corresponding to clustered website screenshots matching customer telemetry, the higher the ranking/priority for a target cluster 124.

Returning now to FIG. 3, at step 310, one or more of the systems described herein may perform a security action that protects against potential phishing attacks by extracting brand information for adding to the dataset. For example, security module 112 may, as part of computing device 202 in FIG. 2, may execute brand recognition techniques on clusters 218 to extract brand information 126 for adding to dataset 208. Security module 112 may extract brand information 126 in a variety of ways as will now be described with respect to FIG. 5.

Turning now to FIG. 5, at step 502, one or more of the systems described herein may identify a logo in the transformed website screenshot to identify image data associated with the brand information. For example, security module 112 may, as part of computing device 202 in FIG. 2, identify a logo in a transformed website screenshot 114 to further identify image data associated with brand information 126. In some examples, the logo identification may be accomplished by testing a cluster 218 with a generic logo detection module (e.g., running a pre-trained neural network to identify generic logos).

At step 504, one or more of the systems described herein may perform optical character recognition (OCR) on a header of a website for the transformed website screenshot to identify text data associated with the brand information. For example, security module 112 may, as part of computing device 202 in FIG. 2, run OCR on a header of a website 212 for a transformed website screenshot 114 to identify text describing brand information 126.

At step 506, one or more of the systems described herein may retrieve text from the website footer to identify additional text data associated with the brand information. For example, security module 112 may, as part of computing device 202 in FIG. 2, extract text describing brand information 126 from a footer of a website 212 (e.g., a copyright statement) for a transformed website screenshot 114.

As a result of performing steps 502-506, security module 112 may enable an analyst to inspect an output of clusters 218 and select new/previously unidentified brands, along with their associated images, for adding to dataset 208.

As explained above in connection with example method 300 in FIG. 3, the systems and methods described herein may utilize discarded URLs to discover new or previously unidentified brands for adding to a dataset of targeted brands that may potentially be utilized in website phishing campaigns. The systems and methods described herein may be utilized to capture a website screenshot (i.e., screenshots that present a login form) and compute its embeddings (i.e., transform an image into a vector utilizing a deep learning model) and further look for matches in a dataset of screenshots (transformed in embeddings as well) of known brands. The systems and methods described herein may further cluster the screenshots based on an adjustable frequency to identify groups of similar websites. The systems and methods described herein may further sort the clusters by relevance based on user telemetry (such that the more URLs corresponding to the screenshots in the clusters match the telemetry the higher the priority). The systems and methods described herein may then run brand recognition techniques on each cluster including, without limitation, generic logo detection, running OCR on a website header, and extracting text and brands from a website footer.

Figure 6:
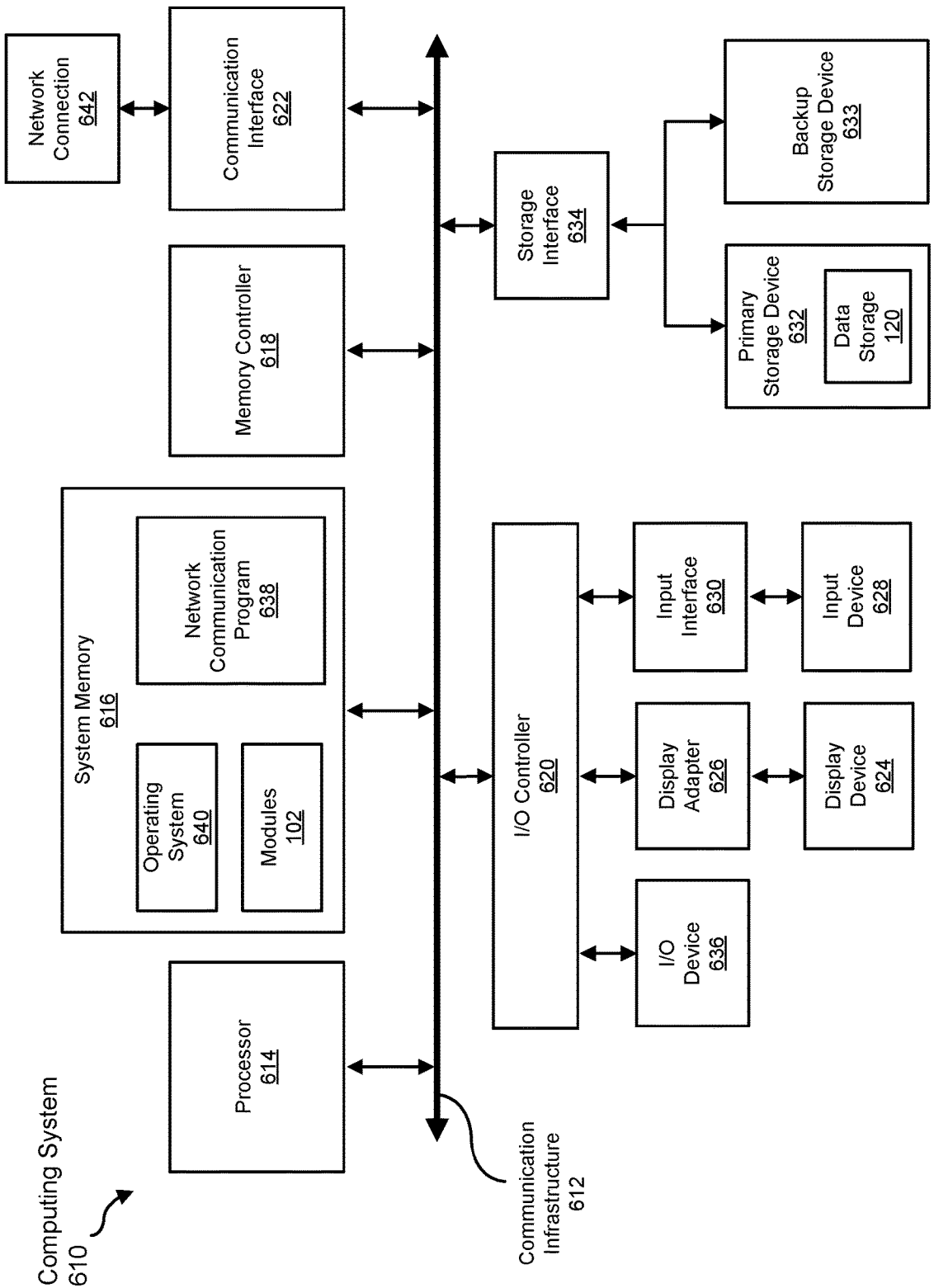
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
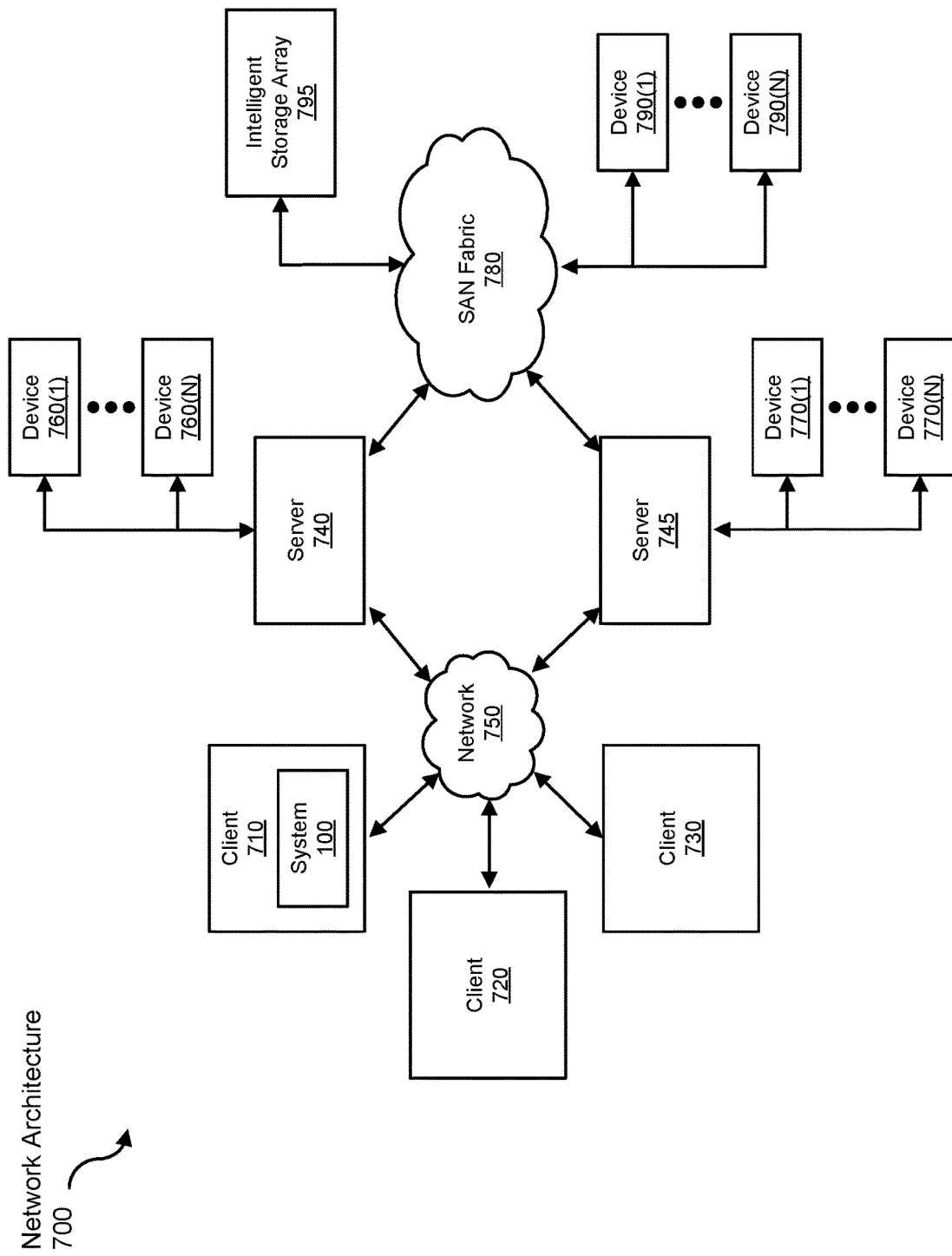
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for identifying brands utilized in website phishing campaigns.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying brands utilized in website phishing campaigns, at least a portion of the method being performed by one or more computing devices comprising at least one processor, the method comprising:
    capturing, by the one or more computing devices, a website screenshot comprising one or more visual elements representing a potential phishing vulnerability;
    transforming, by the one or more computing devices and utilizing a deep learning model, the website screenshot into an image representation comprising a plurality of embeddings;
    determining, by the one or more computing devices, whether the transformed website screenshot matches a dataset comprising a plurality of reference transformed website screenshots representing one or more previously identified brands utilized in phishing campaigns;
    clustering, by the one or more computing devices and upon determining a mismatch between the transformed website screenshot and the dataset, the transformed website screenshot with other transformed website screenshots sharing the visual elements representing the potential phishing vulnerability and one or more visual similarities;
    extracting, by the one or more computing devices, brand information based on the clustering;
    adding, by the one or more computing devices, the extracted brand information to the dataset; and
    performing, by the one more computing devices and based on the dataset, a security action that protects against potential phishing attacks.

2. The computer-implemented method of claim 1, wherein capturing the website screenshot comprises identifying a discarded universal resource locator (URL) associated with a website comprising the website screenshot.

3. The computer-implemented method of claim 1, wherein capturing the website screenshot comprises parsing hypertext markup language (HTML) code for a website associated with the website screenshot to detect the visual elements representing the potential phishing vulnerability.

4. The computer-implemented method of claim 1, wherein capturing the website screenshot comprises utilizing a pre-trained machine learning model to detect the visual elements representing the phishing vulnerability in a website associated with the website screenshot.

5. The computer-implemented method of claim 1, wherein the visual elements representing the phishing vulnerability comprises a website form for receiving authentication credentials.

6. The computer-implemented method of claim 1, wherein transforming, utilizing the deep learning model, the website screenshot into the image representation comprising the plurality of embeddings, comprises reducing a plurality of pixel matrices representing the website screenshot into a corresponding vector representation in a neural network.

7. The computer-implemented method of claim 1, wherein clustering, upon determining a mismatch between the transformed website screenshot and the dataset, the transformed website screenshot with the other transformed website screenshots sharing the visual elements representing the potential phishing vulnerability and the one or more visual similarities, comprises:
    determining a clustering frequency; and
    clustering the transformed website screenshot with the other website screenshots based on the determined frequency.

8. The computer-implemented method of claim 1, wherein clustering, upon determining a mismatch between the transformed website screenshot and the dataset, the transformed website screenshot with the other transformed website screenshots sharing the visual elements representing the potential phishing vulnerability and the one or more visual similarities, comprises:
    identifying user telemetry data corresponding to the transformed website screenshot and the other transformed website screenshots for each of a plurality of target clusters; and
    ranking the target clusters based on a relevance of the user telemetry data with the transformed website screenshot and the other transformed website screenshots.

9. The computer-implemented method of claim 8, wherein the user telemetry data comprises one or more URLs.

10. The computer-implemented method of claim 1, wherein performing, by the one more computing devices and based on the clustering, the security action that protects against the potential phishing attacks by extracting the brand information for adding to the dataset, comprises at least one of:
    identifying a logo in the transformed website screenshot to identify image data associated with the brand information;
    performing optical character recognition on a header of a website for the transformed website screenshot to identify text data associated with the brand information; and
    retrieving text from a footer of the website for the transformed website screenshot to identify additional text data associated with the brand information.

11. A system for identifying brands utilized in website phishing campaigns, the system comprising:
    at least one physical processor;
    physical memory comprising computer-executable instructions and one or more modules that, when executed by the physical processor, cause the physical processor to:

capture, by a capture module, a website screenshot comprising one or more visual elements representing a potential phishing vulnerability;

transform, by a transformation module and utilizing a deep learning model, the website screenshot into an image representation comprising a plurality of embeddings;

determine, by a determining module, whether the transformed website screenshot matches a dataset comprising a plurality of reference transformed website screenshots representing one or more previously identified brands utilized in phishing campaigns;

cluster, by a cluster module and upon determining a mismatch between the transformed website screenshot and the dataset, the transformed website screenshot with other transformed website screenshots sharing the visual elements representing the potential phishing vulnerability and one or more visual similarities;

extract, by a security module, brand information based on the clustering;

add, by the security module, the extracted brand information to the dataset; and perform, by the security module and based on the dataset, a security action that protects against potential phishing attacks.

12. The system of claim 11, wherein the capture module captures the website screenshot by identifying a discarded universal resource locator (URL) associated with a website comprising the website screenshot.

13. The system of claim 11, wherein the capture module captures the website screenshot by parsing hypertext markup language (HTML) code for a website associated with the website screenshot to detect the visual elements representing the potential phishing vulnerability.

14. The system of claim 11, wherein the capture module captures the website screenshot by utilizing a pre-trained machine learning model to detect the visual elements representing the phishing vulnerability in a website associated with the website screenshot.

15. The system of claim 14, wherein the visual elements representing the phishing vulnerability comprise a website form for receiving authentication credentials.

16. The system of claim 11, wherein the transformation module transforms, utilizing the deep learning model, the website screenshot into the image representation comprising the plurality of embeddings, by reducing a plurality of pixel matrices representing the website screenshot into a corresponding vector representation in a neural network.

17. The system of claim 11, wherein the cluster module, upon determining a mismatch between the transformed website screenshot and the dataset, clusters the transformed website screenshot with the other transformed website screenshots sharing the visual elements representing the potential phishing vulnerability and the one or more visual similarities, by:

determining a clustering frequency; and clustering the transformed website screenshot with the other transformed website screenshots based on the determined frequency.

18. The system of claim 11, wherein the cluster module clusters, upon determining a mismatch between the transformed website screenshot and the dataset, the transformed website screenshot with the other transformed website screenshots sharing the visual elements representing the potential phishing vulnerability and the one or more visual similarities, by:

identifying user telemetry data corresponding to the transformed website screenshot and the other transformed website screenshots for each of a plurality of target clusters; and ranking the target clusters based on a relevance of the user telemetry data with the transformed website screenshot and the other transformed website screenshots.

19. The system of claim 11, wherein the security module performs the security action, based on the clustering, that protects against the potential phishing attacks by extracting the brand information for adding to the dataset, by:

identifying a logo in the transformed website screenshot to identify image data associated with the brand information;

performing optical character recognition on a header of a website for the transformed website screenshot to identify text data associated with the brand information; and retrieving text from a footer of the website for the transformed website screenshot to identify additional text data associated with the brand information.

20. A non-transitory computer-readable medium comprising one or more computer-executable instructions that, when executed by at least one processor of a computing device, cause the computing device to:

capture a website screenshot comprising one or more visual elements representing a potential phishing vulnerability;

transform, utilizing a deep learning model, the website screenshot into an image representation comprising a plurality of embeddings;

determine whether the transformed website screenshot matches a dataset comprising a plurality of reference transformed website screenshots representing one or more previously identified brands utilized in phishing campaigns;

cluster, upon determining a mismatch between the transformed website screenshot and the dataset, the transformed website screenshot with other transformed website screenshots sharing the visual elements representing the potential phishing vulnerability and one or more visual similarities;

extract brand information based on the clustering;

add the extracted brand information to the dataset; and perform, based on the dataset, a security action that protects against potential phishing attacks.

\* \* \* \* \*